United States Patent [19]

Agnew, deceased et al.

[11] Patent Number: 4,801,317

[45] Date of Patent: Jan. 31, 1989

[54] HIGH EFFICIENCY PARTICULATE AIR FILTER AND SEPARATORS

[76] Inventors: Boyd F. Agnew, deceased, late of Rancho Mirage, Calif.; by Gertrude B. F. Agnew, legal representative, 11 Santa Clara Dr., Rancho Mirage, Calif. 92270

[21] Appl. No.: 118,936

[22] Filed: Nov. 10, 1987

Related U.S. Application Data

[63] Continuation-in-part of Ser. No. 862,493, May 12, 1986, Pat. No. 4,708,724.

[51] Int. Cl.⁴ .............................................. B01D 46/00
[52] U.S. Cl. ......................................... 55/500; 55/521
[58] Field of Search ................. 55/496, 497, 499, 500, 55/521

[56] References Cited

U.S. PATENT DOCUMENTS

| | | | |
|---|---|---|---|
| 930,561 | 8/1909 | Rahe | 55/484 |
| 3,675,402 | 7/1972 | Weed | 55/496 |
| 4,449,993 | 5/1984 | Bergeron | 55/497 |
| 4,708,724 | 11/1987 | Agnew | 55/521 |

FOREIGN PATENT DOCUMENTS

| | | | |
|---|---|---|---|
| 240893 | 11/1911 | Fed. Rep. of Germany | 55/496 |
| 298280 | 6/1917 | Fed. Rep. of Germany | 55/496 |
| 1022232 | 3/1966 | United Kingdom | 55/521 |

*Primary Examiner*—Bernard Nozick
*Attorney, Agent, or Firm*—I. Louis Wolk

[57] ABSTRACT

This invention relates to a pleated high efficiency particulate air filter and separators therefor in which the separators for filter media to be wound therearound comprise a lattice with tapered struts or spacers, a rounded pleat fold contacting member, and vertically spaced apart air inlet and outlet media supporting flat members to provide uniform internal support for the pleats. The struts are formed to provide a tapered space between filter media and the struts after the media is wound around the separators.

8 Claims, 1 Drawing Sheet

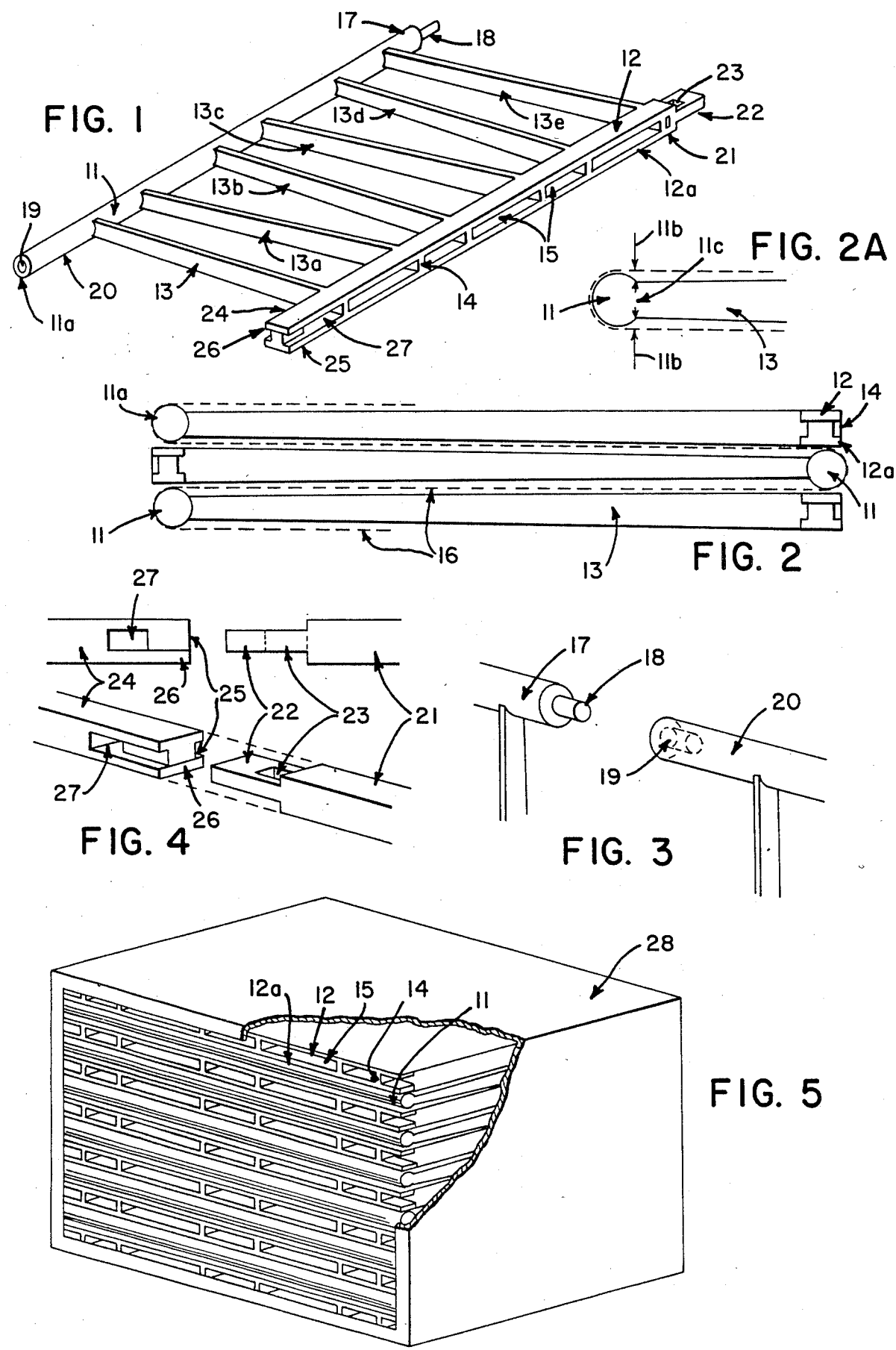

HIGH EFFICIENCY PARTICULATE AIR FILTER AND SEPARATORS

BACKGROUND OF THE INVENTION

This invention is a continuation in part of my copending application Ser. No. 862,493, filed May 12, 1986, now U.S. Pat. No. 4,708,724.

This invention relates generally to pleated filters and to pleat fold spacers which are interposed between pleats. More particularly, the invention relates to high efficiency air filters known in the industry by the acronym, HEPA. Such filters as well as many types of filters used for various air filtering purposes use a porous or microporous filter medium known to the art such as various types of paper or sheet material composed of non-woven fibers which may or may not be of cellulose, glass or plastic fibers or mixtures thereof.

Such filters are made by folding filter media into pleats incorporating suitable spacers between the pleats and then enclosing the pleated assembly within a suitable enclosure in a manner which retains the pleated filter assembly in a size and shape which is suitable for the use to which it is put.

The structure and characteristics of HEPA filters, especially as used in the nuclear industry are described in the "Nuclear Air Cleaning Handbook" published by Oak Ridge National Laboratory. ERDA 76-21 (Burchsted, et al-NTIS).

In my copending application referred to above I have described a rigid truss-like separator which would have none of the short-comings of corrugated foil and other types of separators.

Various types of filters and separators as used in the art are described in U.S. Pat. Nos. 3,321,345, 3,871,851, 4,135,900, 4,147,524 and others.

SUMMARY OF THE INVENTION

In accordance with the present invention as in my prior invention I have designed a novel type of separator which eliminates any sharp corners and edges and provides only smooth, flat and rounded surfaces in engagement with the media after assembly and which permits assembly of the filter by allowing the pleats to be formed around the separators by positioning the separators against the media during formation of the pleats. In addition, in my present improved version of the prior invention, while the pressure between pleats is still carried by the top and bottom horizontal members, the struts in between are undercut so that more media is exposed to collect dust, prolonging the life of the filter and increasing the area of media exposed to air flow, thus increasing capacity and efficiency. This minimizes the blockage of the filter media by thus providing only two line contacts with the media. That is along the media fold area and the edges of the spaced air inlet members.

Secondly, the separators are tapered from the media fold engaging member of the spaced parallel air entry members to permit greater air flow. Additionally, this permits an assembly with a greater number of pleats.

Thirdly, the struts in each separator unit are slanted in opposite directions as described herein so that they are angularly positioned with respect to the media fold members and air inlet members. This is accomplished by alternate positioning at an obtuse angle. This provides shear strength and increases the points of support in the assembled unit since successive pleats are supported by alternately arranged separators in which they face in opposite directions and thus cross each other on opposite sides of the filter media. This also keeps the media more flat and prevents billowing thereof. The degree of angularity will depend upon the size of the separator and the number of struts required for the necessary support. In general, positioning the struts at an angle to the front rear longitudinal members or stringers of from 3–15% is most suitable. This angular positioning also imparts a considerable degree of lateral rigidity to the separator which is transverse to the direction of air flow and strengthens the unit. However, if desired, the struts may also be positioned at right angles where the added lateral rigidity is not important.

The separator described herein is a lattice or girder assembly formed of a pair of spaced parallel longitudinal members or stringers, joined by means of spaced parallel struts extending in the direction of air flow. The rear stringer around which the pleat is formed is provided with a rounded or contoured surface and may be circular, half round or elliptical in cross section, or the like, so that its contact with the inside of the pleat has no sharp corners. The front stringer which separates the air inlet edges of the media is formed of two thin, flat, narrow members spaced apart vertically by the struts to provide a space beteen them for entry and exit of air and which provide flat support for the ends of the pleats. In addition, the overall width of the separator is preferably such that the front stringer with the vertically spaced apart strips extends at least to the ends of the pleats and preferably slightly beyond, say up to ⅛" in order to act as protective buffer for the outer surfaces of the pleat folds.

As mentioned above the struts may have a slight uniform taper from a smaller diameter rear stringer to a greater width of the front stringer which permits a larger inlet opening while still providing uniform flat support and an assembly of uniform thickness when the pleats and separators are alternately superimposed. By means of the type of support provided by this separator, the compression forces are transmitted uniformly from pleat to pleat through said material while avoiding injury to the media. This avoids the risk of damage to the media as to friction and abrasion both during assembly and in use as frequently encountered in the case of corrugated or other types of separators having sharp edges or corners which are in direct contact with the media. Due to the fact that the ends of the separators are adhesively bonded to the adjacent inner surfaces of the filter frame, the separator itself becomes an integral girder like integral part of the assembly and hence greatly increases the ability of the filter to withstand the pressure of air directed at the filter.

In addition, the separator described herein can be formed of multiple standardized sections which can be interlocked or otherwise joined together end to end to permit use for any desired width of media or size of filter.

Because of the rounded structure of the forward stringer, the separator is capable of insertion into the pleat either manually or by machine since it may be forced into engagement against the media along the line of the fold as it is wrapped around the separator during formation of each pleat without any danger of damage to the filter medium. As described the struts are tapered.

This also permits the utilization of a greater number of separators and pleats in a given size of filter.

While the use of tapered struts is shown as a preferred structure, struts of uniform thickness may also be used as long as they are reduced in thickness between their anchored ends and thus permit the media to remain spaced therefrom between the stringers.

DESCRIPTION OF THE DRAWINGS

In the drawings,

FIG. 1 is a view in perspective of a typical separator unit of the invention.

FIG. 2 is an edge view in elevation illustrating the assembly of the separators and media.

FIG. 2A is an enlarged detail view of a strut of FIG. 2 to show the position of the media.

FIG. 3 is a perspective view showing one means for interconnecting the ends of separator units at the rear stringers thereof.

FIG. 4 is a view in perspective showing one means for interconnecting the ends of separator units at the front stringers thereof.

FIG. 5 is a view in perspective of an assembled filter.

DETAILED DESCRIPTION OF INVENTION

As shown in FIG. 1, the separator 10 is in the form of a lattice or bridged member composed of a rear elongated stringer 11 which is shown as cylindrical in shape or circular in cross section so as to present a curved or contoured edge 11a which will engage the inner fold of a pleat formed in the filter medium as described below. Instead of circular cross section, this member may be round tubular, half round or elliptical in cross section or otherwise shaped so as to present a curved or contoured area for contact with the media. A plurality of parallel spaced transverse members or struts 13 and 13a–13e are joined at one end of each to stringer 11 as shown and at the other end to a front longitudinal member 12, 12a in the form of a pair of flat strips vertically spaced apart as shown at 15. This spacing is provided to permit entry and/or exit of air into or from each pleat for filtration. The depth or thickness of each of the elements 11 and 12, 12a and the combined thickness of the front ends of the struts with the strips 12, 12a overlaid thereon is designed to be the same so that the assembly with the filter medium will be of uniform thickness. The struts 13–13e are tapered sufficiently along their length from the point of juncture with strips 12,12a to their juncture with stringer 11 as shown at 11c in FIG. 2A to allow for a continuous space such as 11b in FIG. 2A to be provided between the struts and the media 16 as shown in FIGS. 2 and 2A. The struts are undercut at the other end as shown at 14 so that where overlaid by 12, 12a the assembly is flat. Thus as shown in FIGS. 2 and 2a a tapered space extending from the air inlet portions 15 is established which extends to the stringer 11 and undercut as at 11c.

Also as shown in FIG. 1, struts 13–13e are affixed to stringers 11 and 12, 12a in an angular relationship to their longitudinal position which is described above.

The width of the separators may be such, although not shown, that the open edge formed by the vertically spaced strips 12, 12a project slightly forward, say ⅛", of the folded pleat so that they can act as bumpers to prevent damage to the pleat folds.

As shown in FIG. 3 and 4 the separator sections may be joined end to end by means of a suitable interlocking means which engages a desired number of sections at the ends of the stringers. One such means is shown in FIGS. 1 and 3 in which the rear stringer around which the media is wound has an opening 19 in one end 20 and an extension or dowel 18 in the other end 17. As shown in FIG. 3, dowel 18 can be inserted into a close fitting recess 19. In this way alternate sections can be joined with corresponding engaging means. Similarly, one end 21 of the front stringer assembly 12, 12a can be provided with an extension 22 having a slot 23 which can be forced into a slit formed in an end portion 24 at the opposite end of the stringer. This slit is provided between end segments 25 and 26 in which 25 is dimensioned to engage and interlock with slot 23. Thus providing a typical bayonet and slot function. The strips 12, 12a have sufficient flexibility to permit the insertion of end 22 between 25 and 26 with end portion 22 being received within space 27.

While the foregoing description of the components of the separator has referred to them as individual units, and while the separator may, if desired, be assembled from such units by cementing or otherwise, in practice it is preferred to form the separator as an integral unit by molding of a rigid plastic such as polystyrene, polymethylmethacrylate (plexiglas), polyproplyene or other suitable plastic material. The plastic selected may preferably be fire resistant such as polystyrene U.L. 94V2 grade or better. The separator may also be assembled from separate sections formed of extruded plastic, metal such as aluminium or the like as described further below.

As shown in FIG. 2, the pleats are formed by drawing a sheet 16 of filter medium downward from a roll, the separators are then positioned against the medium with their rounded stringers 11 with their contoured edges held in contact therewith while the medium is folded thereover. This is repeated until the desired number of pleats are formed and the assembly is then compressed together and inserted into a frame which surrounds the ends, top and bottom. The ends of the pleats and separators are potted or bonded into the frame by means of adhesive or the setting of a liquid binder as known to the art.

An assembled filter is shown in FIG. 5 partially open at one end in which the separators are positioned within the pleats of the filter medium and the pleats and the separators are assembled in an enclosure on frame 28. The edges of the pleats and the end struts may be embedded in a plastic layer, or the ends of the stringers and the edges of the pleats may be so embedded.

The potting of the ends of the filter assembly in the frame may be carried out in various ways. In one procedure the filter assembly is placed within the frame, plastic material such as catalyzed epoxy resin or other type of self setting material such as elastomeric polymer is poured in at one side and allowed to set-up. Thereafter the other side is treated in the same way.

Filters of the type described are most commonly made in certain standard configurations which may be assembled in multiple for given usages. In such filters standard dimensions of the separators will be either 5 ¼" or 10 ½" in width and 24", 30", 36" or 48", or more in length, the rounded stringers about 0.05–0.25 in diameter and the struts tapering in vertical thickness from the point of juncture with the rounded stringer of from 0.03–0.2" to the front stringers with a width corresponding to the air inlet space from 0.06–0.125. The struts may have upper and lower flat surfaces of about 0.06–0.125" in with or more as desired, or may be rounded. The struts may also be of rounded cross section. The spacing of the transverse struts may vary depending upon the size of the filter and the conditions of use but in most cases will be from 1" to 4" apart and arranged angularly as described. Of course, other dimensions may be provided where a different pleat separation space is required.

One common type of filter media is in the form of non-woven paper formed on a fourdrinier machine, incorporating micro glass fibers and having an acrylic resin binder. The media may have any desired thickness but 0.015" to 0.020" is usually used.

The flat strips forming the air inlet and outlet stringers of the separator may be ¼"-⅜" in width and about 1/32" in thickness. Where the overall thickness of the separator is 3/16", this would provide a space of ⅛" between upper and lower strips of the stringer for admission and exit of air. The dimensions may be varied to provide other spacing as desired.

As described herein, I have provided an improved HEPA filter that represents an advance in the art in several respects as follows:

There are no sharp corners to bite into the filter media, as is the case with the aluminum foil separators in common use today. Instead, the struts connecting the top rails with the bottom rail take only the air pressure that tends to push the pleats together from the upstream side to the downstream side. The pressure of compressing the pleats together after the pack is formed is transmitted solely through the stringer.

Other pleat supporting means such as cords or longitudinal strips or strips of glue, plastic, etc., will only keep the pleats apart where the width of the pleat is no greater than about 3", whereas in the present structure, where the lateral separators are provided, pleats of almost any width may be utilized.

The pressure of the air against the face of the filter is borne by the separators, which in turn transmit this force to the filter frame itself, in contrast to the way filters are built today, where this force is borne by the media itself. In today's state of the art, the shape of the pleat, forming a deep channel, enables it to bear this force up to a certain extent, but as the pressure increases, the separators, which, because of their corrugated shape, are extremely flexible and begin to deform, and as they do so, the channel shape begins to sag out of form, and at a critical point, the filter pack will blow out. Other types of separators which have sharp edges are also unsuitable as are various types of cords or longitudinal strips which fail to provide uniform support of the type described herein.

Ease of manufacture with metal foil separators, the usual practice is to insert them by hand into pleats made purposely too long. The corrugated separators are themselves cut too long. After the pack has been filled with separators on one side, the entire assembly is turned over, and a corrugated separator is carefully slipped into position in each pleat on the other side. The pack is then sawed to the correct width. This results in a great deal of waste material.

In my process, by contrast, the media is trimmed to finished width, and the pleats with separators can be lowered into an assembly jig and compressed for positioning in a frame without risk of damage to the filter medium.

The filters are much sturdier, not damage prone. The top twin rails, which form slots for the air to enter and leave the pleats, act like bumpers to protect the fragile media. In the case of the foil separators, the projecting corrugations are easily deformed by the slightest contact. These mashed areas are often sources of leaks caused by the media being punctured by the foil as it is bent out of position.

I claim:

1. A separator for pleated air filters which comprises a lattice having a pair of spaced parallel longitudinal members one of which has a rounded outer surface adapted to engage the inner surface of a pleat fold and the other of which is composed of a pair of superimposed vertically spaced apart flat strips, adapted to support the ends of a pair of super imposed pleats, and a plurality of laterally spaced apart transverse strut members joining said longitudinal members said strut members tapering at their narrow width from the inner surface of the member having a rounded outer surface to a wider width at said member formed of spaced apart flat strips.

2. A separator according to claim 1 wherein said struts at their point of juncture with said rounded member are under cut to a narrower width than the diameter of said rounded member in order to provide a tapered space between filter media positioned over said separator between said struts.

3. A separator according to claim 2 wherein said struts are positioned at right angles between said parallel spaced longitudinal members.

4. A separator according to claim 2 wherein said struts are positioned alternately in an angular relationship to right angles with respect to said parallel spaced members in order to provide lateral reinforcement to said separators.

5. A pleated filter comprising a plurality of pleats of a filter medium formed around a plurality of separators, each of said separators comprising a lattice member having a pair of parallel longitudinal spaced members one of which positioned at the rear of each pleat has a rounded surface in engagement with the inner surface of the pleat fold and the other of which is positioned at the air entry position of the pleat and is composed of a pair of superimposed vertically spaced apart flat strips the upper and lower surfaces of which are in engagement with the open edges of the pleat to permit the entry of air to be filtered therebetween said longitudinal members being joined by a plurality of spaced apart transverse struts tapering at their narrow width from the inner surface of the member having a rounded outer surface to a wider width at said member formed of spaced apart flat strips.

6. A pleated filter according to claim 5 wherein each of said tapered struts is undercut to be narrower at its point of juncture with said member having a rounded pleat engaging surface and tapering gradually to a wider width at the juncture with said member formed or spaced apart strips whereby a tapered space is formed betwween said filter medium and said struts to permit air circulation therebetween.

7. A pleated filter according to claim 6 wherein said struts are positioned at right angles to said parallel longitudinally spaced members.

8. A pleated filter according to claim 6 wherein said struts are positioned alternately at obtuse angles to said parallel spaced longitudinal members.

* * * * *